United States Patent
Woo et al.

(10) Patent No.: US 11,373,689 B1
(45) Date of Patent: Jun. 28, 2022

(54) DISK DRIVE CARRIER STOPPER

(71) Applicant: ZT Group Int'l, Inc., Secaucus, NJ (US)

(72) Inventors: John Woo, Secaucus, NJ (US); Chen An, Secaucus, NJ (US); Mahesh Kumar Varrey, Secaucus, NJ (US); Asim Huda, Secaucus, NJ (US)

(73) Assignee: ZT Group Int'l, Inc., Secaucus, NJ (US)

( * ) Notice: Subject to any disclaimer, the term of this patent is extended or adjusted under 35 U.S.C. 154(b) by 0 days.

(21) Appl. No.: 17/126,496

(22) Filed: Dec. 18, 2020

(51) Int. Cl.
  *G11B 33/12* (2006.01)
(52) U.S. Cl.
  CPC .......... *G11B 33/124* (2013.01); *G11B 33/122* (2013.01)
(58) Field of Classification Search
  None
  See application file for complete search history.

(56) References Cited

U.S. PATENT DOCUMENTS

| | | | | |
|---|---|---|---|---|
| 6,442,022 | B1* | 8/2002 | Paul | G11B 33/122 361/679.33 |
| 7,826,208 | B2* | 11/2010 | Wang | H05K 7/1489 361/679.26 |
| 9,437,250 | B2* | 9/2016 | Mundt | G11B 33/125 |
| 9,785,206 | B2* | 10/2017 | Lo | G06F 1/187 |
| 10,008,245 | B1* | 6/2018 | Hoch | H05K 7/20136 |
| 2010/0226083 | A1* | 9/2010 | Wang | H05K 7/1489 361/679.02 |
| 2011/0182023 | A1* | 7/2011 | Xu | G06F 1/187 361/679.33 |
| 2015/0223364 | A1* | 8/2015 | Mundt | G11B 33/124 174/541 |
| 2018/0146569 | A1* | 5/2018 | Schroeder | G11B 33/124 |

* cited by examiner

*Primary Examiner* — William J Klimowicz
(74) *Attorney, Agent, or Firm* — Dergosits & Noah LLP; Todd A. Noah (57) ABSTRACT

A carrier of an electronic device is provided with a soft stopper that may maintain the carrier at a service position within a chassis slot. As the carrier is inserted into the slot, at a determined point the soft stopper impinges upon a bumper. Further movement of the carrier into the slot requires the user to force the soft stopper to compress or flex and bypass the bumper. With the chassis slot vertically oriented the soft stopper may maintain the carrier and electronic device in service position, disconnected, while service is performed on a chassis circuit board.

8 Claims, 6 Drawing Sheets

DISK DRIVE CARRIER STOPPER

BACKGROUND

Some servers may require a large number of hard disk drives (HDDs) to be vertically connected to a PCB board that sits within the server chassis. Normally, to service such a PCB board, all of the HDD's need to be disconnected from the board and then set aside. Once the PCB board has been serviced, each HDD will then need to be installed back into the chassis.

The need to remove each HDD is unsatisfactory. The mere removal of an HDD can lead to handling or electrostatic discharge (ESD) damage. The reinstallation may be a time consuming process. It may also be inconvenient because there may not be enough space near the server for a significant number of HDDs. Furthermore, the HDDs may need to be reinstalled in the exact same chassis slot order, creating the potential for subsequent issues and errors due to the additional burden on the technician of keeping track of the drive positions, and re-installing the drives in proper order.

Thus, what is needed is a drive carrier that reduces the handling of the drive and need for complete removal when the PCB is being serviced.

BRIEF DESCRIPTION OF THE DRAWINGS

The embodiments are illustrated by way of example and not limitation in the accompanying drawings, in which like references indicate similar elements, and in which.

DETAILED DESCRIPTION

In an embodiment, a carrier of an electronic device, e.g., an HDD, is provided with a feature, a soft stopper, that may hold the HDD in a service position above and disconnected from the PCB. This allows the PCB to be serviced without having to remove the HDD completely from the chassis. In an embodiment, the soft stopper is a compressible bump provided on the carrier. As the carrier is slid down into the chassis slot, at a predetermined height above the PCB, the soft stopper abuts a raised section, or bumper, associated with the slot. At this point the carrier, populated with an electronic device, is at the service position in which the electronic device is not connected to the PCB and the PCB may be serviced. The carrier and electronic device may remain suspended at this service position until the PCB service is completed. When the PCB service is completed, the user may apply a force to the carrier that causes the soft stopper to compress or flex and allow the carrier to move past the raised section associated with the slot. Thus, in embodiments, once the user has completed the PCB service, the user need only apply a small force to the carrier to move the electronic device from the service position back to the connected position.

Thus, with a soft stopper according to embodiments, the electronic device may remain associated with its designated slot position even while the PCB is being serviced. With carriers that provide such a service position for each electronic device, the PCB may be freely serviced without the technician having to find space to store the numerous electronic devices and without having to maintain a proper association between any electronic device and its designated slot. A carrier with such a feature could reduce PCB service time by reducing the required to disconnect, label, store, and reconnect each electronic device.

In an embodiment, a soft stopper is added to a carrier of an electronic device, e.g., an HDD, and a bumper is included in the chassis slot. When the carrier of the embodiment is lowered into the chassis slot, at the designated service height the soft stopper encounters and is stopped by the bumper. To move the carrier further into the slot, the user is required to exert a slight force to the carrier, which causes the soft stopper to deform and move past the bumper. In an embodiment, the combined weight of the carrier and the electronic device is insufficient to cause the soft stopper to deform enough for the carrier to move past the bumper. In other words, the carrier and electronic device will remain suspended at the designated service height until the user applies an additional force.

In an embodiment, the locations of the soft stopper and the bumper may be switched—the carrier may include the bumper and the soft stopper may be added to the chassis slot. In an embodiment, the bumper may be replaced by a soft stopper such that both the carrier and the chassis slot include a soft stopper.

In embodiments, the force necessary to move the carrier past the service position may be adjusted to be high enough to prevent the accidental movement of the carrier past the service position, e.g., as may happen if the user accidentally bumps the chassis or carrier.

In an embodiment, a soft stopper may include a raised section of a carrier rail that is separated from the majority of the carrier rail by a slot. In the embodiment, at the service position, the raised section of the carrier rail encounters a bump formed into the carrier slot.

Figure 1:
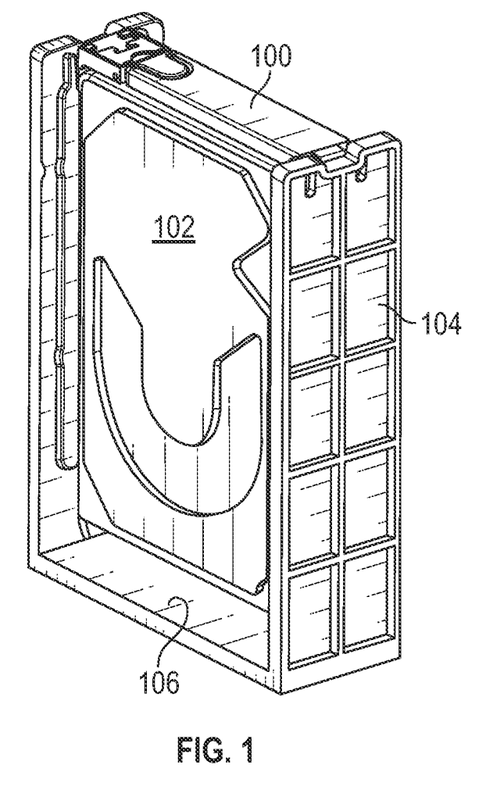
FIG. 1 is a top, right perspective view of an embodiment of a carrier in a first state and populated with an electronic device.

FIG. 1 is a top, right perspective view of an embodiment of a carrier 100 in a first state and populated with an electronic device 102. In FIG. 1, carrier 100 is populated with an electronic device 102. For example, electronic device 102 may be an HDD and chassis slot 104 may be within a server. However, embodiments are envisioned that are dimensioned to accept devices other than an HDD and be located within devices other than a server. In FIG. 1, carrier 100 is slid down within a chassis slot 104 having, at its bottom, a PCB 106 (FIG. 1 illustrates a segment of a server chassis, e.g., server slot 700 (FIG. 7), containing a single slot and a segment of the chassis PCB). Carrier 100 is depicted in a connected position in which electronic device 102 is connected to a PCB 106 having a PCB-side connector 108 (FIG. 2).

Figure 2:
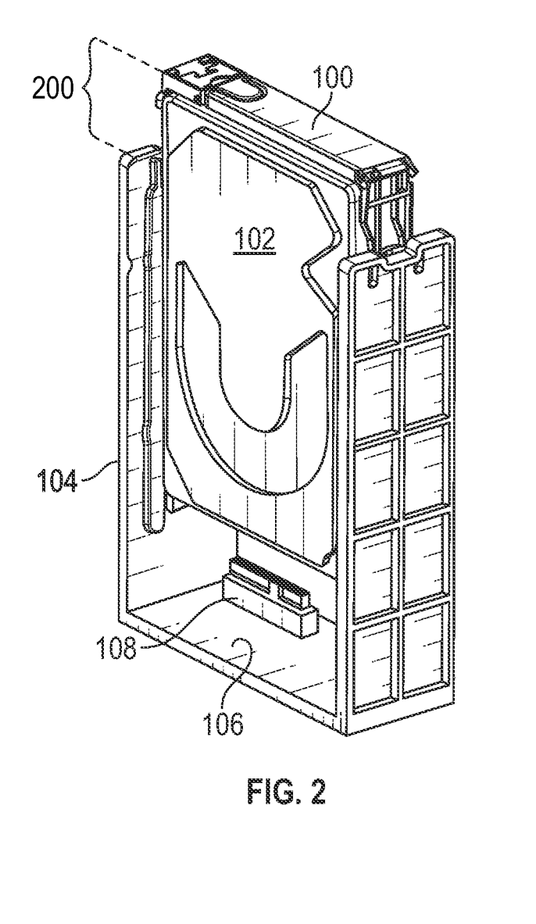
FIG. 2 is a top, right perspective view of the embodiment of FIG. 1 in a second state.

FIG. 2 is a top, right perspective view of the embodiment of FIG. 1 in a second state. In FIG. 2, carrier 100 is depicted being held at a service position a distance 200 from the connected position of FIG. 1. With carrier 100 being retained at the service position distance, a user may service PCB 106 without completely removed carrier 100 or electronic device 102 from chassis slot 104. While it is not shown, electronic device 102 is provided with a downward oriented connector that mates with PCB-side connector 108 when carrier 100 is in the connected position shown in FIG. 1.

Figure 3:
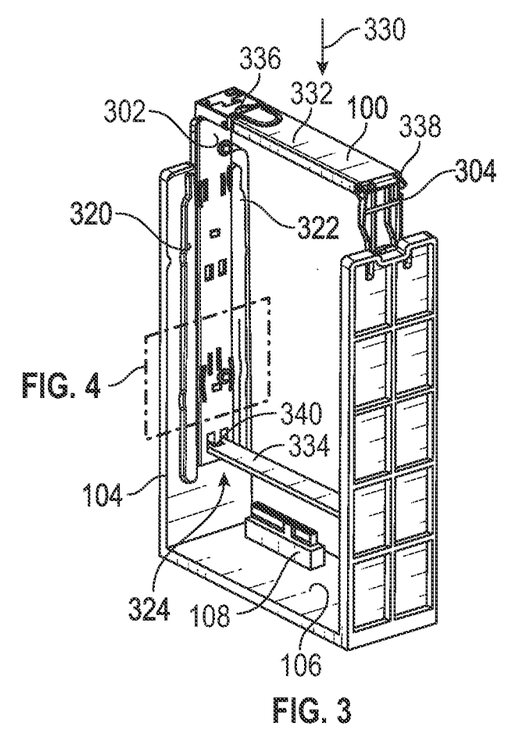
FIG. 3 is a top, right perspective view of the embodiment of FIG. 2 when unpopulated.

FIG. 3 is a top, right perspective view of the embodiment of FIG. 2, at the service position, and with carrier 100 unpopulated. In FIG. 3, carrier 100 is shown to include carrier rails 302, 304, a top cross-member 332, and a bottom cross-member 334. Top cross-member 332 may be opened at a latch 336 and pivoted about a hinge 338 to admit electronic device 102 to the space between the carrier rails and cross-members. Chassis slot 104 includes a track (or "slot" or "groove") 324 between a track rail 320 and a track rail 322. In the embodiment, chassis slot 104 includes a track that accepts carrier rail 304 and is a mirror image of track 324. Similarly, carrier rail 304 is a mirror image of carrier rail 302. Thus, the description of carrier rail 302 and track 324 applies equally to carrier rail 304 and its associated track. In FIG. 3, the bottom ends of rails 302, 304 of carrier 100 have been positioned within the respective tracks of chassis slot 104 and carrier 100 has been slid downward in direction 330 to the service position above connector 108. In FIG. 3, bottom cross-member 334 is dimensioned to allow PCB-side connector 108 to connect with the downward-oriented connector (not shown) of electronic device 102. To facilitate populating carrier 100 with an electronic device 102, carrier 100 may further include a hinge 340 allowing side rail 302 to swing out.

Figure 4:
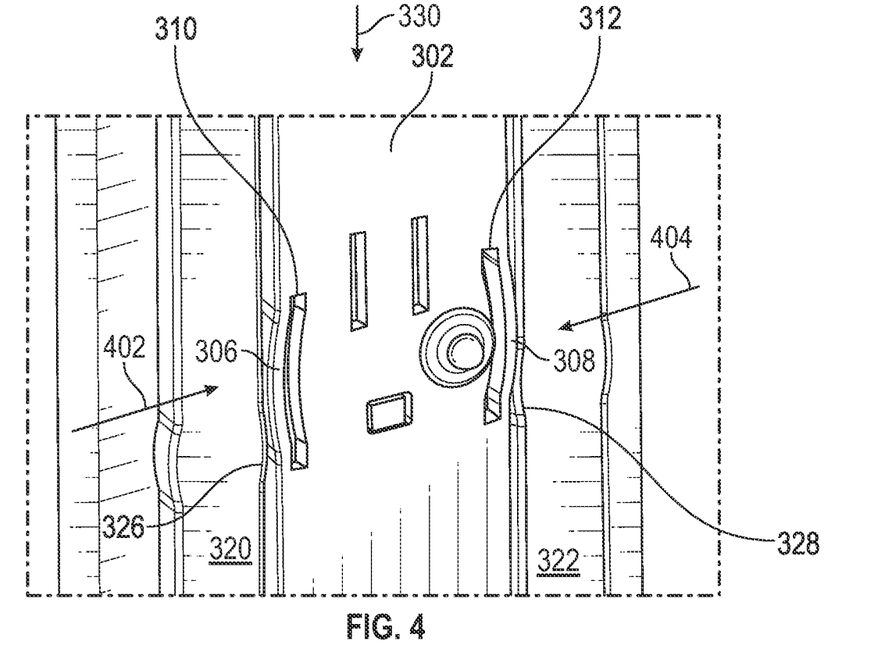
FIG. 4 is an enlarged view of the indicated section of FIG. 3.

FIG. 4 is an enlarged view of the indicated section of FIG. 3. FIG. 4 illustrates the embodiment of the soft stoppers that retain carrier 100 at the service position as shown in FIG. 3. In FIG. 4, a first soft stopper includes a raised section 306 of rail 302. Raised section 306 is separated from the remainder of rail 302 by a slit 310. Similarly, a second soft stopper includes a raised section 308 of rail 302. Raised section 308 is separated from the remainder of rail 302 by a slit 312. Raised sections 306, 308 function as leaf springs and may be compressed in directions 402, 404 by movement in direction 330 against bumpers 326, 328, respectively, with the necessary compression force determined by the dimensions of raised sections 306, 308 and their material composition.

FIG. 4 also shows that track rail 320 includes its own raised section, or bumper 326 along an edge of track rail 320. Similarly, track rail 322 includes bumper 328 along an edge of track rail 322. As shown in FIG. 3 and FIG. 4, carrier 100 is maintained in the service position by raised sections 306, 308 resting on, or abutting, bumpers 326, 328, respectively. In the embodiment of FIG. 1-FIG. 4, when the user wishes to connect the electronic device to PCB connector 108, the user applies a force in direction 330 to carrier 100. With sufficient force, raised sections 306, 308 (and similar raised sections on carrier rail 304) will be compressed by bumpers 326, 328 (and similar bumpers for carrier rail 304), respectively. Thus, in the embodiment of FIG. 4, the force applied must cause the compression of four soft stoppers before carrier 100 will move from the service position to the connected position.

In an embodiment with carrier 100 oriented vertically, one or more soft stoppers may be configured such that the combined weight of the carrier populated with an electronic device is insufficient to cause the soft stoppers (however many are included in the embodiment) to deform enough for the carrier to move past the associated bumper or bumpers. In other words, the carrier and electronic device will remain suspended at the designated service height until the user applies an additional force.

In embodiments, the force required to move the chassis past the service position may be adjusted by changing the dimensions and materials of the stopper and bumper, e.g., changing the stopper or carrier rail material, changing one or more stopper dimensions (thickness, length, width, or raised height), changing the bumper length or height, or changing the angle of contact between stopper and bumper.

In embodiments, different numbers of soft stoppers may be sufficient to maintain carrier 100 in the service position. For example, a single soft stopper, e.g., raised section 306 and corresponding bumper 326 may be sufficient to maintain carrier 100 in the service position. Or, one soft stopper on carrier rail 302 and a second soft stopper on carrier rail 304 and associated bumpers may be sufficient to maintain carrier 100 in the service position.

In an embodiment, the spring element and the bumper element may switch positions. For example, raised section 306 and slit 310 may be provided on rail 320 and bumper 326 may be disposed on carrier rail 302. In an embodiment, bumper 326 may be replaced by a raised section and associated slit so that both carrier rail 302 and track rail 320 are provided with a soft stopper.

In an embodiment, a soft stopper may include a cantilever spring attached to a carrier rail. In the embodiment, at the service position, an end of the cantilever spring encounters a bumper that is also an upper edge of the carrier slot.

Figure 5:
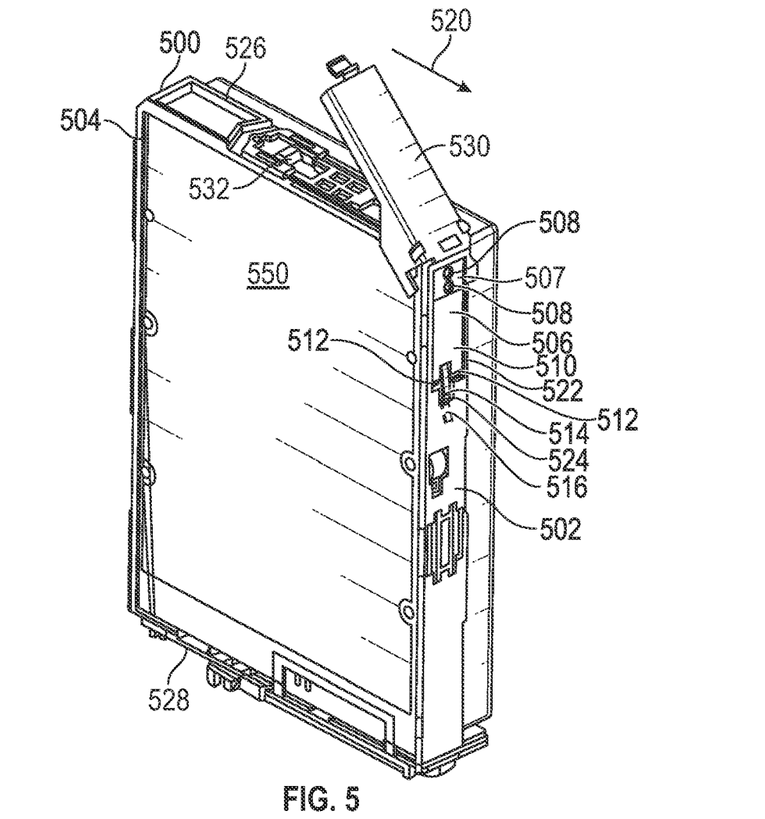
FIG. 5 is a top, front right perspective view of an embodiment of a carrier in a first state and populated with an electronic device.
Figure 7:
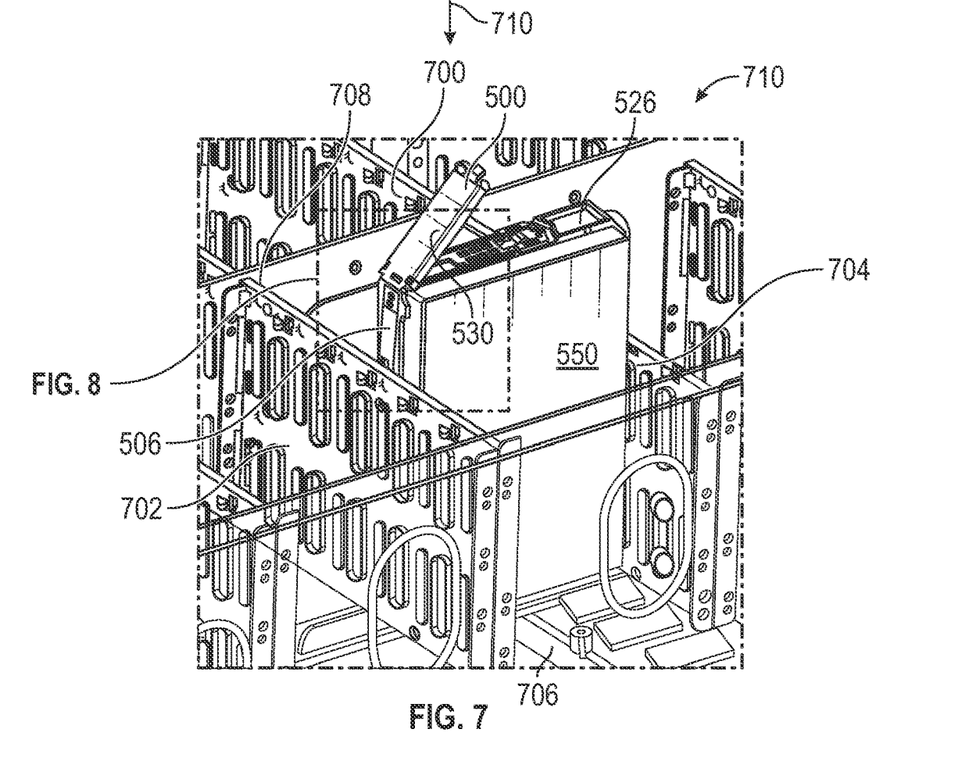
FIG. 7 is a top, rear right perspective view of the embodiment of FIG. 5 in a second state, populated with an electronic device, and within a chassis.

FIG. 5 is a top, front right perspective view of an embodiment of a carrier 500 in a first state and populated with an electronic device. In FIG. 5, an embodiment of a carrier 500 includes a soft stopper 506. FIG. 5 depicts soft stopper 506 pressed flat within a recess 522, as if carrier 500 were fully inserted into a chassis slot and the side of the chassis slot were forcing soft stopper 506 into recess 522. Absent such a compressive force, soft stopper 506 extends from carrier 500 in a direction 520, as shown in FIG. 7 and FIG. 8. In FIG. 5, carrier 500 is shown populated with an electronic device 550. Electronic device 550 may be as described with reference to electronic device 102, or different from device 102, though both are provided with downward facing connectors (given the orientation of device 550 shown in FIG. 5.). Carrier 500 includes carrier sides 502, 504 that are configured to slide into a chassis slot, e.g., slot 700 (FIG. 7). Carrier 500 includes a top cross-member 526 and a bottom cross-member 528 joining carrier sides 502, 504 to create a frame with a space for receiving electronic device 550. Carrier 500 may include a lever 530 with a catch 532 for securing carrier 500 within the chassis slot.

Soft stopper 506 includes a connector tab 507, a cantilever spring section 510, and a guide tab 514. Stopper 506 is fastened to carrier side 502 through holes 508. Cantilever spring section 510 and tab 507 form an angle causing cantilever spring to extend in direction 520 from carrier 500. Cantilever spring 510 is provided with curved shoulders 512 that terminate at edges 518. Shoulders 512 are the parts of soft stopper 506 that abut bumper 708 and hold carrier 500 in the service position, as will be discussed with regard to FIG. 7 and FIG. 8. Tab 514 includes a tab retaining section 516. As seen with regard to FIG. 5, with cantilever spring 510 compressed and received by recess 522, tab 514 extends from cantilever spring 510, through a tab slot 524 and under (or behind) carrier side 502. When cantilever spring 510 extends in direction 520 from recess 522, tab 514 emerges from tab slot 524, with tab retaining section 516 remaining under or behind carrier side 502. When carrier 500 is lowered into chassis slot 700, tab 514 ensures that shoulders 512 are positioned to abut bumper 708, as will be discussed.

Figure 6:
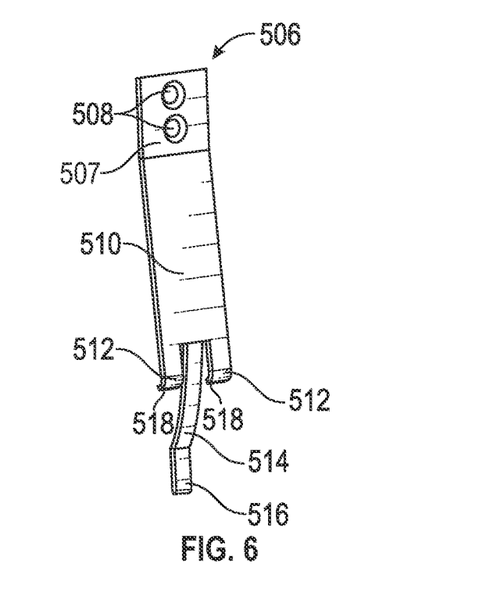
FIG. 6 is an enlarged view of an element of the embodiment of FIG. 5.

FIG. 6 is an enlarged view of soft stopper 506 of carrier 500. In FIG. 6, soft stopper 506 is shown in the relaxed state, as indicated by the angle between tab 507 and cantilever spring 510, and also by the angle between cantilever spring 510 and tab 514. When carrier 500 is lowered into slot 700, as bumper 708 moves up carrier side 502, bumper 708 encounters tab 514. With further downward movement of carrier 500, bumper 708 travels up tab 514, compressing tab 514 into tab slot 524 along the way. As tab 514 is compressed into tab slot 524, it forces cantilever spring 510 toward and into recess 522. And with the movement of cantilever spring 510 into recess 522, shoulders 512 are brought inward (the reverse of direction 520) and toward the advancing bumper 708. Thus, as carrier 500 is lowered into slot 700, tab 514 is compressed by the advancing bumper 708 and this causes shoulders 512 to be retracted so that shoulders 512 align with, then abut, bumper 708, which hinders the further advance of bumper 708.

FIG. 7 is a top, rear right perspective view of the embodiment of carrier 500 in a second state, populated with electronic device 550, and within chassis slot 700. The configuration of carrier 500 in FIG. 7 is considered a second state because soft stopper 506 is extended from carrier side 502 in comparison to the first state of FIG. 5. FIG. 7 also illustrates carrier 500 held in the service position above a PCB 706 by shoulders 512. In FIG. 7, chassis slot 700 includes sides 702, 704 extending up from PCB 706. Sides 702, 704 and carriers sides 502, 504 cooperate to guide carrier 500 in direction 710 down to PCB 706 and align the connector of electronic device 550 with the PCB-side connector (not shown, but similar to connector 108 (FIG. 2)). Slot side 702 includes a top edge 708, which is the bumper that encounters and hinders shoulders 512.

Figure 8:
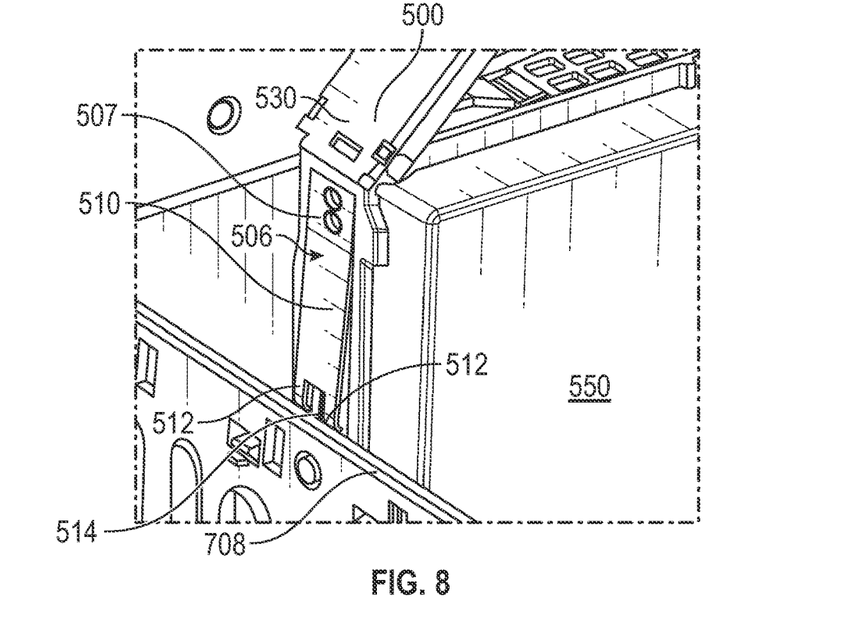
FIG. 8 is an enlarged view of the section indicated in FIG. 7.

FIG. 8 is an enlarged view of the section indicated in FIG. 7. In FIG. 8, carrier 500 has descended into slot 700 to the extent that slot edge 708 has travelled up tab 514 and encountered shoulders 512. As shown, tab 514 is slightly angled away from the section of cantilever spring 510 to which shoulders 512 are attached. Thus, shoulders 512 extend further from carrier 500 than does tab 714. After slot edge 708 makes initial contact with tab 714 and carrier 500 descends further, slot edge 708 travels over the surface of tab 714, compressing tab 714 toward device 550. However, since shoulders 512 extend further from carrier 500 than the surface of tab 714, when slot edge 708 reaches shoulders 512, shoulders 512 do not easily pass under slot edge 708 and thereby hinder further downward travel of carrier 500.

In an embodiment, the combined weight of carrier 500 and electronic device 550 is insufficient to cause cantilever spring 510 of soft stopper 506 to deform and recede into recess 522. As a result, in the embodiment, carrier 500 and electronic device 550 will remain suspended at the designated service height until the user applies an additional force.

In embodiments, the force required to move chassis 500 past the service position may be adjusted by changing the dimensions and materials of the stopper and bumper, e.g., changing the cantilever spring material, changing one or more stopper dimensions, e.g., cantilever spring thickness or width, shoulder curvature, the number of shoulders 512, or the amount shoulders 512 extend past tab 14 (which would change the angle of incident contact between shoulders 512 and slot edge 708, where a slight angle of contact would facilitate edge 708 passing over shoulders 512). Similarly, in an embodiment, a second soft stopper 506 may be added to carrier side 504.

As described above with regard to the figures, "top" and "bottom" were used to describe both the carrier embodiments and the chassis slots because of the vertical orientation shown in the figures. If the chassis slot were oriented horizontally, then the "top" of the vertical carrier would be equivalent to the "front" of the horizontally-oriented carrier and "bottom" would be equivalent to the "back" or "rear" of the horizontally-oriented carrier. However, the orientation of the chassis slot should not be understood to limit the embodiments of the carrier and embodiments of the carrier may be used with chassis slots oriented in other directions, e.g., horizontally or other angles. As such, in embodiments, the side of a carrier oriented toward the PCB may be considered the PCB-side or connector side. Similarly, the side of the carrier opposing the PCB and generally providing access to the technician or user may be considered a user-accessible side or chassis-slot top side.

The previous description is provided to enable any person skilled in the art to practice the various aspects described herein. In the embodiments, the separation of various system components in the embodiments described above should not be understood as requiring such separation in all embodiments. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. An apparatus comprising:
   a first track provided on a first side of a first device slot and including a first track rail and a second track rail, the first track rail including a first track rail edge and a second track rail edge, the second track rail including a third track rail edge and a fourth track rail edge;
   a first side rail configured to slide between the second track rail edge and the third track rail edge, the first side rail including a first side rail edge corresponding to the second track rail edge and a second side rail edge corresponding to the third track rail edge;

a first raised section disposed on the first side rail edge; and a first cross-member extending from the first side rail proximal to a first end of the first side rail, wherein:

the second track rail edge includes a second raised section disposed between a beginning of the first track rail and an end of the first track rail;

at least one of the first raised section or the second raised section is compressible;

movement of the first side rail along the first track rail from the beginning toward the end of the first track rail causes the first raised section to abut the second raised section;

upon abutting the second raised section, further movement of the first side rail toward the end of the first track rail requires an application of a force to the first side rail sufficient to cause at least one of the first raised section or the second raised section to compress; and the first track rail edge includes a third raised section disposed between a beginning of the first track rail and an end of the first track rail on a first side of a second device slot such that movement of a second side rail, configured identically to the first side rail, in the second device slot along the first track rail edge, causes a fourth raised section of the second side rail to abut the third raised section of the first track rail edge.

2. The apparatus of claim 1, wherein:
one of the first raised section or the second raised section includes a spring; and
the application of the force causes the spring to be compressed.

3. The apparatus of claim 2, wherein the spring includes an elongate section of the first side rail edge of the first side rail separated from a remainder of the first side rail by a first slit.

4. The apparatus of claim 2, wherein the spring includes an elongate section of the first side rail edge separated from a remainder of the first side rail by a first slit, and
upon abutting the second raised section, the first end of the first side rail is a first distance from the end of the first track, the first distance being equal to or greater than a second distance associated with disconnecting a device connector from a mating connector.

5. The apparatus of claim 4, further comprising:
a third side rail configured to slide along a second track in the first device slot, the third side rail including a third side rail edge and a fourth side rail edge corresponding to a fifth track rail edge and a sixth track rail edge of the second track;
a fifth raised section disposed on the third side rail edge, the fifth raised section including an elongate section of the third side rail edge separated from a remainder of the third side rail by a second slit; and a second cross-member extends between the first side rail and the third side rail proximal to a second end of the first side rail and a second end of the third side rail, wherein:

the fifth track rail edge includes a sixth raised section disposed between a beginning of the second track and an end of the second track;

the first cross-member extends between the first side rail and the third side rail proximal to the first end of the first side rail and a first end of the third side rail;

the second cross-member, first cross-member, first side rail, and the third side rail create a frame that defines a space configured to receive an electronic device provided with the device connector;

movement of the first side rail along the first track and the third side rail along the second track from the beginnings toward the ends of the first and second tracks, respectively, causes the first raised section to abut the second raised section and the fifth raised section to abut the sixth raised section;

upon the first raised section abutting the second raised section and the fifth raised section abutting the sixth raised section, further movement of the first and third side rail toward the ends of the first and second tracks requires the force to be great enough to cause both the first and fifth raised sections to compress.

6. The apparatus of claim 5, wherein:
the mating connector is connected to a printed circuit board (PCB) within a chassis; and
when the first device slot is positioned within the chassis, and the electronic device is received within the frame, and the frame is slid along the first and second tracks until the first raised section abuts the second raised section and the fifth raised section abuts the sixth raised section, the first side rail is at the first distance and the device connector is not mated with the mating connector.

7. The apparatus of claim 6, wherein:
when the first device slot is oriented vertically within the chassis, the electronic device is received within the frame, and the frame is slid down the first and second tracks until the first raised section abuts the second raised section and the fifth raised section abuts the sixth raised section, the force must exceed the force of gravity acting on the frame and electronic device to compress both the first and fifth raised sections.

8. The apparatus of claim 7, further comprising a first hinge joining the second cross-member to the first or third side rail and a second hinge joining the first cross-member to the first or third side rail, wherein the second cross-member is provided with a latch and configured to open to admit the electronic device to the space.

* * * * *